May 21, 1957  J. G. INGRES  2,792,686
BOOSTER BRAKE MECHANISM
Filed Aug. 3, 1953  2 Sheets-Sheet 1

INVENTOR
JEANNOT G. INGRES
BY John F. Phillips
ATTORNEY

May 21, 1957　　　J. G. INGRES　　　2,792,686
BOOSTER BRAKE MECHANISM
Filed Aug. 3, 1953　　　　　　　　　　　2 Sheets-Sheet 2

INVENTOR
JEANNOT G. INGRES
BY John F. Phillips
ATTORNEY

United States Patent Office 2,792,686
Patented May 21, 1957

2,792,686

BOOSTER BRAKE MECHANISM

Jeannot G. Ingres, Dearborn, Mich., assignor to Kelsey-Hayes Company, a corporation of Delaware Application August 3, 1953, Serial No. 371,871

14 Claims. (Cl. 60—54.6)

This invention relates to booster brake mechanisms for motor vehicles wherein a vacuum or similar booster motor is employed for supplementing the force to be applied by the operator in applying the brakes.

It is the increasing trend in the automobile industry, particularly on passenger cars, to use relatively low brake pedals or treadles to facilitate the transferring of the operator's right foot from the accelerator pedal to the brake pedal. The use of a low pedal or treadle reduces the leverage through which the operator operates the mechanism for applying the brakes, and in most installations substantial force is necessary on the brake pedal to "crack" the valves to initiate the operation of the booster motors.

An important object of the present invention is to provide a novel construction, particularly with relation to the control valves for the booster motor, so that a low treadle may be employed for operating the brakes and wherein a low "cut-in" pedal force is all that is required to initiate the operation of the motor of the booster mechanism.

A further object is to provide a novel valve arrangement wherein the parts are so constructed and arranged as to provide a pressure balance against the valve device at the lap position of the valves, and to provide a construction wherein extremely low effort is required to move the valves to lap position and wherein the force acting to tend to return the valve parts to such position is so low beyond the lap point as to require little pedal effort during the initial operation of the booster mechanism.

A further object is to provide such a mechanism wherein it is entirely feasible to use poppet valves for controlling the air and vacuum or other differential pressures for operating the motor, without any appreciable tendency of the valve to "stick" in any position due to differential pressures acting thereon and tending to retain it in such position.

Other objects and advantages of the invention will become apparent during the course of the following description.

In the drawings I have shown one embodiment of the invention. In this showing:

Figure 1:
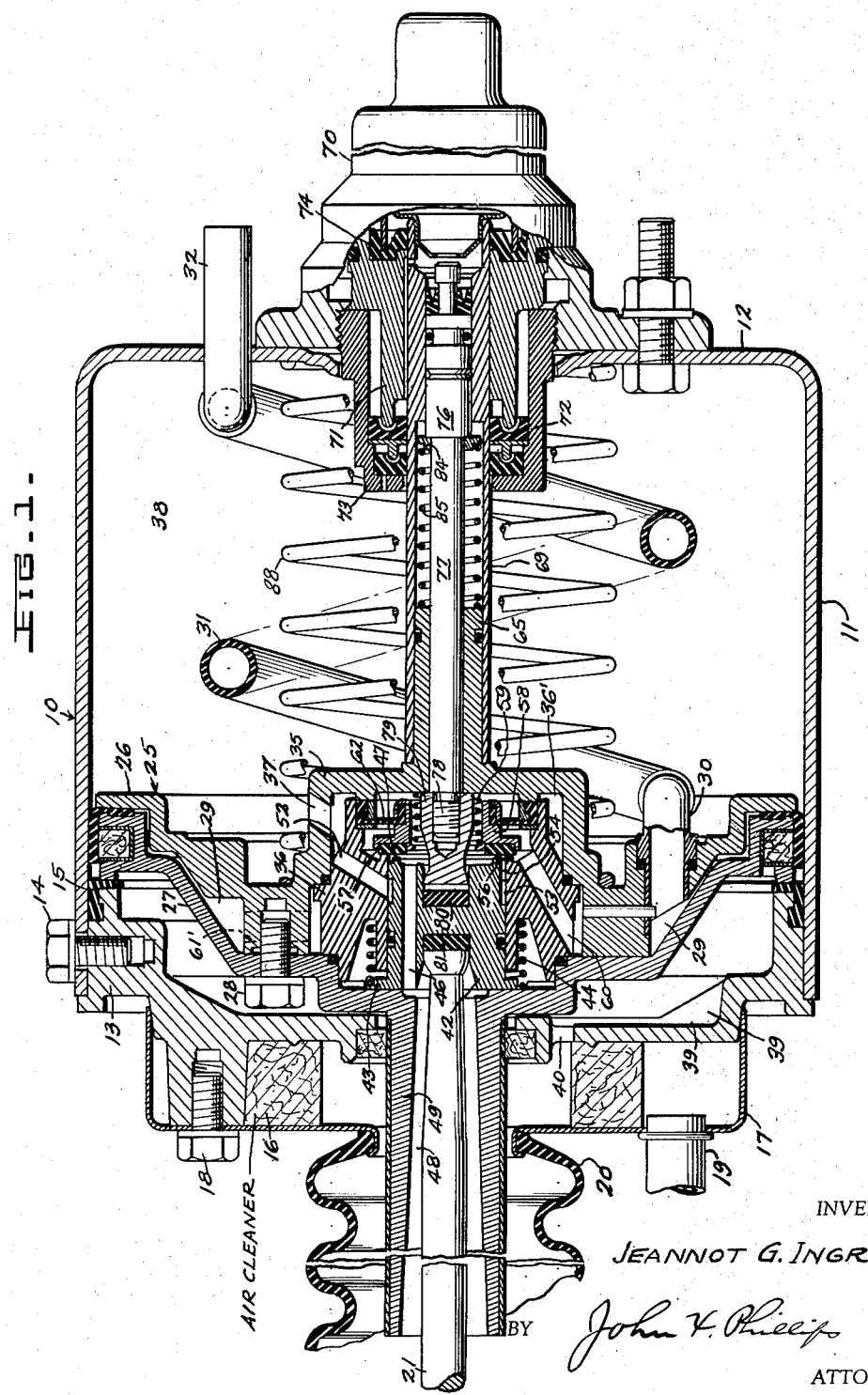
Figure 1 is an enlarged fragmentary sectional view taken axially through a booster brake mechanism, parts being broken away and parts being shown in section.

Referring to Figure 1 the numeral 10 designates a booster motor as a whole comprising a preferably pressed cylinder 11 closed at one end as at 12 and provided at its opposite end with a preferably die cast head indicated as a whole by the numeral 13. This head is secured in position in the end of the cylinder 11 by means of suitable screws 14, and the inner extremity of the cylinder head is sealed with respect to the cylinder 11 to prevent leakage, as at 15.

The head 13 is provided therewithin with an air cleaner 16 capped as at 17, the cap being secured in position by suitable screws 18. Air is supplied to the interior of the cap 17 through a suitable pipe section 19. The radially inner extremity of the cap 17 is connected to a rubber or similar longitudinally collapsible boot 20 of the conventional type, the outer end of which (not shown) is sealed with respect to a rod 21 mechanically connected in any suitable manner to the brake pedal of the vehicle (not shown).

Reciprocable within the cylinder 11 is a piston unit indicated as a whole by the numeral 25 and comprising sections 26 and 27, secured together by suitable screws 28 and forming therebetween an annular chamber 29. The piston section 26 carries an angle nipple 30, one end of which communicates with the annular chamber 29 and the other end of which is connected to a spiral flexible rubber or other hose 31. The opposite end of this hose is connected to an angle nipple 32 extending through the cylinder end 12 and adapted for connection with a suitable conduit to the intake manifold of the motor vehicle engine or other suitable source of subatmospheric pressure.

The piston unit 26 is provided with a hollow hub portion 35 in which is arranged an annular valve seat unit 36. This seat unit is reduced in diameter at its inner end to cooperate with the hub 35 to form an annular chamber 36', and this chamber communicates through an opening 37 with the variable pressure chamber 38 of the motor, the end of the cylinder 11 at the opposite side of the piston unit forming a constant pressure chamber 39. It will become apparent that, in the present instance, the piston unit is atmosphere-suspended in its off position and is energized by the exhaustion of air from the chamber 38. The chamber 39 is always in communication with the atmosphere through a port 40.

A second valve seat unit 42 is axially slidable in the unit 36 and is provided at its left hand end as viewed in Figure 1 with an outstanding flange 43. A compression spring 44 engages at one end against this flange and has its opposite end engaging against the inner end of a recess in the unit 36. The unit 42 accordingly is biased to its off position with the unit 42 engaging the adjacent surface of the piston unit 27. In practice, the spring 44 exerts a force of about two pounds tending to retain the parts in the position shown in Figure 1.

The unit 42 is provided with a longitudinal passage 46 communicating at its right hand end with an annular space arranged within a valve seat element 47. At its left hand end, the passage 46 communicates with a space 48 within an extended sleeve 49 formed integral with the piston unit 27 and surrounding the rod 21. It is into the space 48 that air flows from the air cleaner, after passing through the boot 20, and the admission of air into the motor chamber 38 and the cutting off of the air into such chamber is controlled by valve means to be described.

The seat unit 36 is provided with a passage 52 communicating between the annular space 36' and an annular groove 53 formed in the outer surface of the unit 42. The unit 42 is grooved from the annular passage 53 to the right hand end thereof as at 54, and accordingly it will be apparent that when the valve elements are in the "off" position shown in Figure 1, air flows through passage 46, through passage 54 into the annular groove 53, thence through passage 52 and port 37 into the motor chamber 38, thus retaining atmospheric pressure in such chamber when the motor is de-energized.

The right hand end of the seat unit 36 adjacent the valve seat 47 is provided with an annular seat 56 adapted for engagement under conditions to be described with a molded rubber or other deformable valve element 57 of annular form. The valve element 57 is carried by a preferably die cast valve body 58. The valve element 57 engages the seat 56 in the "off" positions of the parts shown in Figure 1 and in the lap positions in Figure 2, but is held off the seat 56 by its engagement with the seat 47 when the parts are in the motor energized positions shown in Figure 3. A spring 59 has one end engaging the end of the hub 35 and has its opposite end engaging the valve body 58 to urge the latter toward the left relative to the piston unit 26. The spring 59 is relatively light and preferably exerts approximately one pound pressure acting toward the left upon the valve body 58.

A passage 60 through the unit 36 communicates between a chamber 61, in which the valve body 58 is arranged, and an annular space 60' surrounding the unit 36. This space in turn communicates with the chamber 29 through a radial passage 61' in the piston unit 26. In this connection, it will be noted that the plane of section of the upper half of each of Figures 2 and 3 is somewhat at an angle to that of Figure 1 in order to show the passage 61', which is shown in dotted lines in Figure 1.

A flexible diaphragm 62 has its inner end seated in a groove in the valve element 58 and has its outer end engaging an annular shoulder 63 forming a part of the valve seat unit 36. The radially outer extremity of the diaphragm 62 is preferably retained in position by a ring 64. It will be obvious that the radially outer portion of the diaphragm 62 is stationary with respect to the piston unit 25 while the radially inner portion of the diaphragm is axially movable with the valve body 58. In the "off" and lap positions of the parts the right hand extremity of the valve body 58 is spaced from the end of the hub 35.

The piston unit 26 and its hub 35 are provided with a preferably integral axial extension 65 surrounded by a plunger sleeve 69. This sleeve has a snug fit with the projection 65 and extends into a master cylinder 70 which may be conventional in construction and operation. The sleeve 69 is operable in a bearing 71 carried by the body of the master cylinder and is operable in suitable seals indicated as a whole by the numeral 72 housed within a cap 73 secured to the master cylinder body. At its right hand extremity, the bearing 71 carries a seal 74 snugly surrounding the adjacent end of the sleeve 69.

Figure 2:
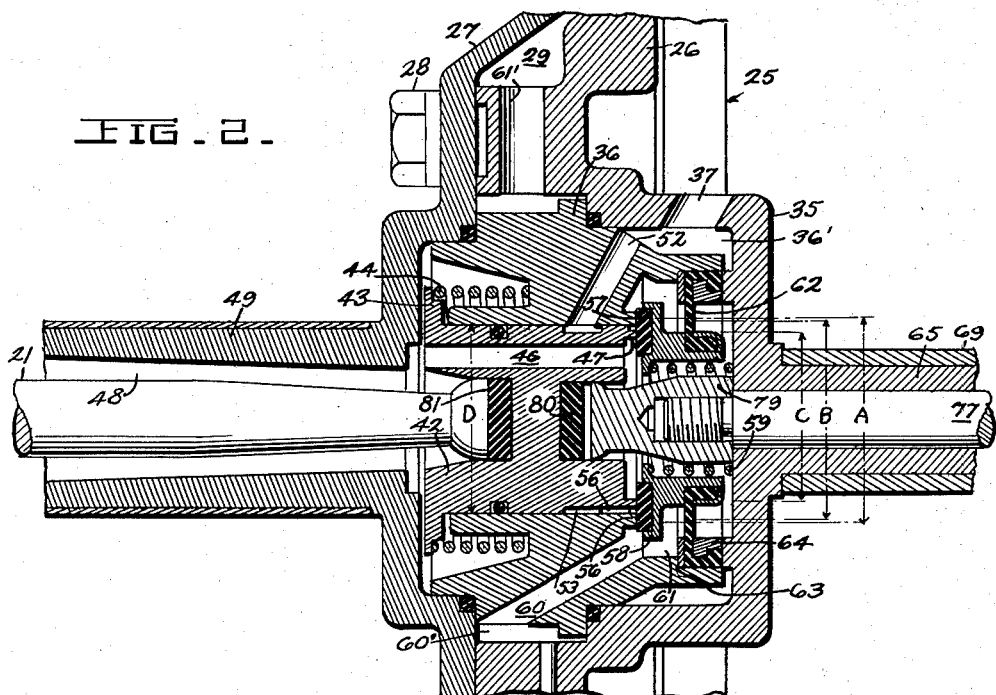
Figure 2 is an enlarged axial sectional view through the valve mechanism and associated parts, the valve parts being shown in lap position.
Figure 3:
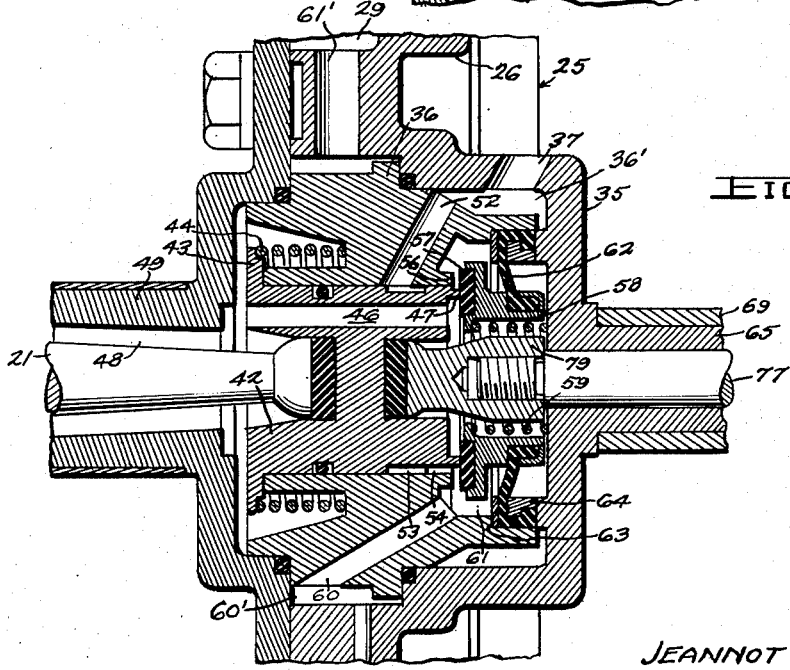
Figure 3 is a similar view showing the parts in a fully applied brake position.

The right hand end of the sleeve 69 is thickened to provide a bearing for a plunger unit 76 carried by a rod 77 threaded as at 78 into an axial spool 79 extending into a recess in the adjacent end of the valve seat unit 42 and normally spaced as in Figures 1 and 2 from a cushion 80. A similar cushion 81 is arranged in the recess in the opposite end of the valve seat unit 42 to be engaged by the adjacent end of the rod 21. This rod is in constant engagement with its pad 81, while the pad 80 engages the spool 79 only under predetermined motor operating conditions as further referred to below.

Referring to Figure 1 it will be noted that the plunger 76 has seated thereagainst a spring seat 84, and a compression spring 85, surrounding the rod 77, engages at one end against the adjacent end of the projection 65 and at its opposite end against the seat 84. This spring accordingly urges the rod 77 toward the right and retains the right hand end of the spool 79 against the head of the hub 35 in the "off" and lap positions of the parts, but a space occurs between these elements under later operating conditions to be referred to, under which conditions the play between the cushion 80 and spool 79 is taken up.

A return spring 88 tends to maintain the piston unit 25 in the normal "off" position. One end of this spring engages against the cylinder end 12 while the other end surrounds the hub 35 and engages the piston unit 26.

The relative areas of the parts affected by fluid pressures in the valve mechanism are important in the operation of the present device. In this connection it is pointed out that the diaphragm 62 has its radially outer portion fixed with respect to the piston unit while the radially inner portion is fixed to the valve body 58. Atmospheric pressure is always present at the right side of this diaphragm and when there is differential pressure present on opposite sides of the diaphragm, this will be due to vacuum at the left and the air pressure at the right will urge the diaphragm toward the left. The outer half of the diaphragm however will be fixed with respect to the piston unit and accordingly only the inner half will be effective for urging the valve body 58 toward the left. It is the area within the mean diameter of the diaphragm, therefore, which is effective for urging the diaphragm and the valve element 58 toward the left, and this mean diameter is indicated by the broken lines A in Figure 2. In a typical and desirable installation, this mean diameter is 1.06". The center diameter of the valve seat 56, that is, the diameter of a circle midway of the width of the narrow valve seat 56, is important relative to the mean diameter of the diaphragm 62. In the same typical installation referred to, the center diameter of the vacuum valve seat 56 is 1.025", and this diameter is represented by the letter B in Figure 2. Also of importance in the most efficient operation of the device is the relative center diameter of the air valve seat 47 and the diameter of the valve seat unit 42. The center area of the air valve seat 47 is indicated at C in Figure 2, while the diameter of the valve seat unit 42 is represented by the letter D in the same figure. The relationship of these areas will be further referred to below.

*Operation*

The parts normally occupy the "off" positions shown in Figure 1. Under such conditions, vacuum will be present in the annular space 29 due to its connection with the source through the coiled pipe 31. This vacuum will be communicated through passage 60 to the chamber 61 in which the valve body 58 is arranged. With the vacuum valve 56 closed, as in Figure 1, this vacuum can be supplied to no other point beyond the chamber 61. At the same time, the air valve 47 will be opened.

Under such conditions it will be apparent that air will flow through space 48 and passage 46, radially outwardly around the valve seat element 47, through passage 54, channel 53, passage 52 and port 37 into the chamber 38. The chamber 39 of the motor will be in fixed communication with the source of atmospheric pressure through port 40.

Assuming that the operator desires to apply the brakes, he will depress the brake treadle (not shown) to move the rod 21 toward the right. Starting from the position shown in Figure 1, the valve seat unit 42 will be moved to the right and this movement will be opposed solely by the spring 44. Relatively slight movement of the unit 42 will move the air valve seat 47 into engagement with the molded valve element 57, the parts then assuming the lap position shown in Figure 2. Beyond this point, the air valve 47 will exert a pressure against the valve element 57, thus shifting this element toward the right and disengaging it from the vacuum seat 56. This will move the valve parts to the motor energizing positions shown in Figure 3. Engagement of the air valve 47 with the valve element 57 obviously will cut off the flow of air from the source around the air valve 47, and accordingly no further air will flow into the chamber 61 and through passage 60, and the motor chamber 38 will be cut off from the source of atmospheric pressure.

As soon as the valve element 57 is moved out of engagement with the vacuum valve 56, the motor chamber 38 will be connected through port 37, passage 52, chamber 61, passage 60, annular space 29 and flexible hose 31 with the source of subatmospheric pressure and accordingly air will be exhausted from the motor chamber 38. Obviously this subjects the piston unit 25 to differential pressures on opposite sides thereof, and the piston unit accordingly will start to move toward the right, imparting similar movement to the sleeve 69 to move the sleeve into the master cylinder and displace fluid therefrom into the wheel cylinders. Attention is invited to the fact that the spring 85 seats at opposite ends against the axial extension 65 and against the plunger 76, and accordingly this spring will carry with it, upon movement of the sleeve 69, the spool or head 79, this head remaining in engagement with the inner face of the end of the hub 35 as in Figures 1 and 2. Accordingly, both the sleeve 69 and plunger 76 will operate as a unit to displace fluid from the master cylinder, and since the head 79 advances with the piston unit as the valve seat unit 42 is advanced, the space between the cushion 80 and the head 79 will be maintained.

If the operator depresses the pedal for a partial brake application and then arrests movement of the pedal, it will be obvious that in accordance with the operation of the follow up valve, the piston unit will advance with respect to the rod 21 to return the parts to the lap position shown in Figure 2.

Assuming that the operator continues to depress the brake treadle to continue movement of the rod toward the right, energization of the motor 10 will continue and movement of the sleeve 69 and plunger 76 into the master cylinder will continue to displace fluid from the master cylinder, take up the play between the brake shoes and the brake drums, and then build up a substantial relatively static pressure in the master cylinder.

After this pressure in the master cylinder has been built up to a predetermined point, depending upon the tension of the spring 85, for example, at a hydraulic pressure of 50–55 p. s. i., the plunger 76 will start to move relatively toward the left with respect to the sleeve 69 due to the reaction of the hydraulic pressure in the master cylinder against the plunger 76. This overcomes the normal loading of the spring 85 as will be apparent, and the spool 79 will move to the left relative to the valve seat unit 42 until its left hand end engages the cushion 80, the parts now assuming the positions shown in Figure 3. From this point on, there will be a definite mechanical connection from the brake treadle, through rod 21, unit 42 and rod 77 to the plunger 76, and the operator will feel in the treadle a reaction force proportionate to the hydraulic pressure generated in the master cylinder. The ratio of the pressure encountered by the operator's foot will be the ratio of the area of the plunger 76 to the effective area of the sleeve 69, and this ratio may be anything which may be desired, and may be designed accordingly.

Prior to the point at which a "run out" of power in the motor occurs, there will remain a gap between the flange 43 and the adjacent end of the unit 36, the operator up to the point of power "run out" feeling the proportionate hydraulic pressure reaction referred to above. As soon as the point of power "run out" occurs, however, the flange 43 will engage the adjacent end of the unit 36 as shown in Figure 3, and beyond this point, the operator adds his force to the force of the motor in applying pressure to the piston unit 25 and sleeve 69 to assist in building up hydraulic pressure in the master cylinder. Beyond the point of power "run out," therefore, the piston unit 25 and its sleeve 69 and the plunger 76, rod 77 and rod 21 will move as a unit.

When the brakes are to be released, the operator will lift his foot from the brake pedal, whereupon the spring 59 will promptly move the valve seat unit 42 to its normal "off" position with the air valve 47 open and the vacuum valve 56 closed as in Figure 1. The motor chamber 38 will now be disconnected from the source of subatmospheric pressure and will be connected to the atmosphere to balance pressures in the motor chambers 38 and 39. The spring 88 will move the piston unit 25 back to its normal off position and the spring 44 will return the unit 42 to its normal off position relative to the unit 36.

As previously stated, the mean diameter of the diaphragm 62, as indicated by the letter A in Figure 2, in a typical installation, is 1.06" while the center diameter of the vacuum valve seat 56, indicated by the letter B in Figure 2, is 1.025". The resultant difference in area of .057 square inch, when subject to a differential pressure of 10 p. s. i. (20" Hg vacuum) develops a force of .57 pound which holds the valve 57 on the valve seat 56 as shown in Figure 1. In other words, there will be a net effective area tending to move the valve body 58 and valve element 57 toward the left to maintain the valve element in engagement with the vacuum seat 56. The balancing valve spring 59 is of low rate, preferably having a 1 pound loading which acts in the same direction with the diaphragm force of .57 pound, yielding a total 1.57 pound force holding the vacuum valve seat closed.

The atmosphere valve seat 47 is held in the "off" position with a force preferably of 2 pounds in the spring 44. This force of 2 pounds plus the 1.57 pound diaphragm and spring force, plus an indeterminate friction force due to the conventional O ring surrounding the valve seat unit 42, yields an approximate total of 3½ to 4 pounds cut-in force required to put the unit in operation. Disregarding the hydraulic reaction effects, once the unit has gone into operation with the atmosphere valve 47 closed and the vacuum valve 56 open, a force is created which tends to keep the atmosphere valve closed. The unit 42, in the typical installation referred to, has a diameter of .978", this being the area indicated by the letter D in Figure 2. The atmosphere valve 47 has a center diameter of .837", such area being indicated by the letter C in Figure 2. This gives rise to an area difference of .2 square inch and when subjected to 10 p. s. i., produces a pressure force of 2 pounds which tends to keep the atmosphere valve closed, but the 2 pound spring 44 acts in opposition to this differential pressure of 2 pounds, thus nullifying the pressure unbalance. In effect therefore, the atmosphere valve piston or unit 42 is now balanced.

With the valve unit in motor energizing condition, a vacuum unbalance force is created, arising from the difference in area of the diaphragm 62 (diameter of 1.06") and the area of the atmosphere valve 47 (seat diameter of .837"). The area difference is .332 square inch, and with 10 p. s. i. acting, a force of 3.32 pounds will exist, rather than the .57 pound in the "off" positions of the parts as referred to above. To this force of 3.32 pounds is added the 1 pound force of the balancing spring 59, giving a total force of 4.32 pounds tending to return the valve parts to the lap position. This particular force is of no importance when operating the brakes, but it is desirable that it be reduced or eliminated in the lap position to permit the parts freely to return to normal position. As previously stated, pressures affecting the unit 42 are balanced in the lap position, and in releasing the brake pedal, the parts will return to the lap position, whereupon pressures and forces will be balanced thus enabling the atmosphere valve return spring 44 to return the unit 42 to its normal "off" position.

It will be apparent that when no power is present, for example, if the vacuum line should break or the vehicle engine is not running, the operator can, by exerting substantial force on the brake pedal, secure a reasonable degree of manual brake application. Under such conditions, movement of the rod 21 to the right will move the unit 42, take up the space between the pad 80 and the adjacent end of the head 79, thus operating the plunger 76. Moreover, the flange 43 will move into engagement with the adjacent end of the unit 36, and the piston unit 25 and sleeve 69 will be manually operated to generate hydraulic pressure in the master cylinder for the manual application of the brakes.

From the foregoing it will be apparent that the present construction provides for a fine control of pressures and other forces controlling elements of the valves and valve seats, thus preventing any sticking of the valves. Moreover, the "cut-in" pressure is very substantially reduced as is the force which must be applied manually to the rod 21 during brake application up to the power "run out" point. Accordingly, it is highly feasible and practicable to use the present construction with a low brake pedal or treadle, it having been found in practice that the device is operable with a high degree of efficiency by a brake treadle arranged no higher than the accelerator pedal for the motor vehicle engine.

It is to be understood that the construction shown is illustrative and that the invention is defined in the appended claims.

I claim:

1. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, a vacuum valve seat fixed with respect to said pressure responsive unit, an atmospheric valve seat axially slidable radially inwardly of said vacuum valve seat, and valve seats being annular and having a space therebetween communicating with said variable pressure chamber, a valve element engageable with said seats, means subject to the pressure of the atmosphere and to pressure in said source for urging said valve element toward said seats, means biasing said atmospheric valve seat away from said valve element to a normal position disengaged therefrom, the effective areas of said means for urging said valve element toward said seats, when said valve element is in engagement with said vacuum seat, being slightly overbalanced to urge said valve element toward said seats when the atmospheric valve seat is disengaged from said valve element, and manually operable means for moving said atmospheric valve seat in the other direction to engage said valve element and move it away from said vacuum valve seat.

2. A device constructed in accordance with claim 1 provided with an axially movable seat unit one end of which carries said atmospheric valve seat, such seat being annular and the mean area of the circle defined thereby being less than the effective area of the opposite end of said seat unit and such latter end being subject to atmospheric pressure to provide a net pressure tending to urge said atmospheric valve seat toward said valve element, said biasing means slightly overcoming said net pressure when said atmospheric valve is disengaged from said valve element.

3. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a first seat unit and a second seat unit the former of which is carried by said pressure responsive unit and the latter of which is axially slidable within and with respect to said first seat unit, a first annular valve seat carried by said first seat unit, a second annular valve seat carried by said second seat unit within and concentric with said first valve seat, there being an annular space between said valve seats communicating with said variable pressure chamber, a valve element engageable with said seats, a valve body carrying said valve element, a pressure movable element connecting said valve body to said pressure responsive unit and forming with said pressure responsive unit and with said first seat unit a pair of spaces one of which, at the side of said pressure movable element opposite said valve seats, is open to the atmosphere and the other of which communicates with a source of vacuum, said pressure responsive element, said valve body and said valve element constituting an axially movable assembly, means biasing said second seat unit in one direction away from said valve element to a normal position to disengage its valve seat from said valve element, the effective area of said pressure movable element subject to atmospheric pressure slightly exceeding the effective area of said assembly subject to pressure in said source, when said second valve seat is in normal position, to provide a net fluid pressure urging said valve element toward said seats, and manually operable means for moving said second seat unit in the opposite direction to engage its valve seat with said valve element and move said assembly in the last-named direction to disengage said valve element from the valve seat of said first seat unit and connect said annular space to said variable pressure chamber.

4. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, a first seat unit carried by said pressure responsive unit and having an annular vacuum valve seat, there being a space outwardly of said vacuum valve seat communicating with said source, a second seat unit axially slidable within said first seat unit and having a passageway means communicating with said variable pressure chamber, an atmospheric valve seat carried by said second unit concentric with said vacuum valve seat, there being a space between said seats communicating with said passageway means and there being a space within said atmospheric valve seat in fixed communication with the atmosphere, an axially movable valve element engageable with said seats, means biasing said second unit to a normal position away from said valve element, and a pressure movable device subject to differences in pressures between the atmosphere and said first-named space for slightly biasing said valve element into engagement with said vacuum seat when said second unit is in normal position.

5. A device constructed in accordance with claim 4 wherein said pressure movable device comprises a diaphragm fixed at its radially inner edge with respect to said valve element and fixed at its radially outer edge with respect to said pressure responsive unit.

6. A device constructed in accordance with claim 4 wherein the mean area of the circle defined by said atmospheric valve seat is slightly less than the effective area of the other end of said second unit and such other end being subject to atmospheric pressure to provide a net pressure urging said second unit away from said normal position and which net pressure is slightly overcome by said biasing means.

7. A device constructed in accordance with claim 4 wherein the mean area of the circle defined by said atmospheric valve seat is slightly less than the effective area of the other end of said second unit and such other end being subject to atmospheric pressure to provide a net pressure urging said second unit away from said normal position and which net pressure is slightly overcome by said biasing means, said pressure movable device comprising a diaphragm fixed at its radially outer edge with respect to said pressure responsive unit and at its radially inner edge with respect to said valve element.

8. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, said pressure responsive unit comprising an annular vacuum valve seat having a space radially outwardly thereof connected to said source, a manually operable unit, an annular atmospheric valve seat carried by said manually operable unit and movable axially therewith relative to said vacuum valve seat, there being a space between said valve seats communicating with said variable pressure chamber, an annular valve element engageable with said seats, means biasing said valve element toward said seats, said manually operable unit being axially movable in one direction to engage said valve element and disengage it from said vacuum valve seat whereupon the space between said valve seats communicates with the space radially outwardly of said vacuum valve seat to connect said source to said variable pressure chamber, the area of the end of said manually operable unit inwardly of said atmospheric valve seat being subject to atmospheric pressure and the opposite end of said manually operable unit being of larger effective area and constantly subject to atmospheric pressure whereby, when said atmospheric valve seat moves said valve element out of engagement with said vacuum valve seat, there will be a net pressure tending to urge said manually operable unit toward said valve element, and a spring acting in the opposite direction against said manually operable unit and balancing said net pressure.

9. A device constructed in accordance with claim 8 wherein the means biasing said valve element toward said seats comprises a pressure movable unit oppositely subject to atmospheric pressure and the vacuum in said space outwardly of said vacuum valve seat, the atmospheric pressure affecting said pressure movable unit slightly overbalancing the vacuum in said last-named space when said manually operable element is in normal position.

10. A device constructed in accordance with claim 8 wherein the means for biasing said valve element toward said valve seats comprises a valve body carrying said valve element, and an annular diaphragm connected at its radially inner edge to said valve body and fixed at its radially outer edge to said pressure responsive unit.

11. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, a master cylinder, a plunger sleeve carried by said pressure responsive unit and operable in said master cylinder, a vacuum valve seat fixed with respect to said pressure responsive unit, an atmospheric valve seat axially slidable radially inwardly of said vacuum valve seat, said valve seats being annular and having a space therebetween communicting with said variable pressure chamber, a valve element engageable with said seats, means subject to the pressure of the atmosphere and to pressure in said source for urging said valve element toward said seats, means biasing said atmospheric valve seat away from said valve element to a normal position disengaged therefrom, the effective areas of said means for urging said valve element toward said seats, when said valve is in engagement with said vacuum seat, being slightly overbalanced to urge said valve element toward said seats when the atmospheric valve seat is disengaged from said valve element, manually operable means for moving said atmospheric valve seat in the other direction to engage said valve element and move it away from said vacuum valve seat, and a plunger slidable in said plunger sleeve and having lost motion connection at one end with said atmospheric valve seat when the latter is in normal position, the other end of said plunger being exposed to pressure in said master cylinder.

12. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, a master cylinder, a plunger sleeve carried by said pressure responsive unit and operable in said master cylinder, a vacuum valve seat fixed with respect to said pressure responsive unit, an atmospheric valve seat axially slidable radially inwardly of said vacuum valve seat, said valve seats being annular and having a space therebetween communicating with said variable pressure chamber, a valve element engageable with said seats, means subject to the pressure of the atmosphere and to pressure in said source for urging said valve element toward said seats, means biasing said atmospheric valve seat away from said valve element to a normal position disengaged therefrom, the effective areas of said means for urging said valve element toward said seats, when said valve is in engagement with said vacuum seat, being slightly overbalanced to urge said valve toward said seats when the atmospheric valve seat is disengaged from said valve element, manually operable means for moving said atmospheric valve seat in the other direction to engage said valve element and move it away from said vacuum valve seat, a plunger slidable in said plunger sleeve, means biasing said plunger in one direction toward said master cylinder, means limiting movement of said plunger in said direction, and a lost motion connection between one end of said plunger and said atmospheric valve seat, the other end of said plunger being exposed to pressure in said master cylinder.

13. A booster brake mechanism comprising a differential fluid pressure motor having a casing and a pressure responsive unit therein dividing it into a pair of chambers one of which is a constant pressure chamber in fixed communication with the atmosphere and the other of which is a variable pressure chamber, a source of vacuum, a master cylinder, a plunger sleeve carried by said pressure responsive unit and operable in said master cylinder, a first seat unit carried by said pressure responsive unit and having an annular vacuum valve seat, there being a space outwardly of said vacuum valve seat communicating with said source, a second seat unit axially slidable within said first seat unit and having a passageway means communicating with said variable pressure chamber, an atmospheric valve seat carried by said second unit concentric with said vacuum valve seat, there being a space between said seats communicating with said groove and there being a space within said atmospheric valve seat in fixed communication with the atmosphere, an axially movable valve element engageable with said seats, means biasing said second unit to a normal position away from said valve element, a pressure movable device, including an annular diaphragm, fixed at its radially inner edge with respect to said valve element and at its radially outer edge with respect to said pressure responsive unit, subject to pressure in said first-named space and to atmospheric pressure at the side of said diaphragm opposite said valve element to provide a net pressure urging said valve element toward said seats, and a plunger in said sleeve having lost motion connection at one end with said second seat unit, the other end of said plunger being exposed to pressure in said master cylinder.

14. A device constructed in accordance with claim 13 provided with means biasing said plunger toward said master cylinder, and means limiting movement of said plunger toward said master cylinder, said lost motion connection being provided between said last-named means and said second seat unit.

References Cited in the file of this patent

UNITED STATES PATENTS

| 1,687,047 | Trail | Oct. 9, 1928 |
| 1,765,760 | Duty et al. | June 24, 1930 |
| 1,831,737 | Broussouse et al. | Nov. 10, 1931 |

(Other references on following page)

UNITED STATES PATENTS

| | | |
|---|---|---|
| 2,260,491 | Stelzer | Oct. 28, 1941 |
| 2,275,697 | Stelzer | Mar. 10, 1942 |
| 2,457,721 | Price | Dec. 28, 1948 |
| 2,458,803 | Stelzer | Jan. 11, 1949 |
| 2,475,105 | Mitton | July 5, 1949 |
| 2,532,960 | Stelzer | Dec. 5, 1950 |
| 2,685,170 | Price | Aug. 3, 1954 |
| 2,685,171 | Price | Aug. 3, 1954 |
| 2,685,172 | Price | Aug. 3, 1954 |
| 2,690,740 | Hupp | Oct. 5, 1954 |

FOREIGN PATENTS

| | | |
|---|---|---|
| 747,273 | France | Mar. 28, 1933 |